Figure 1:
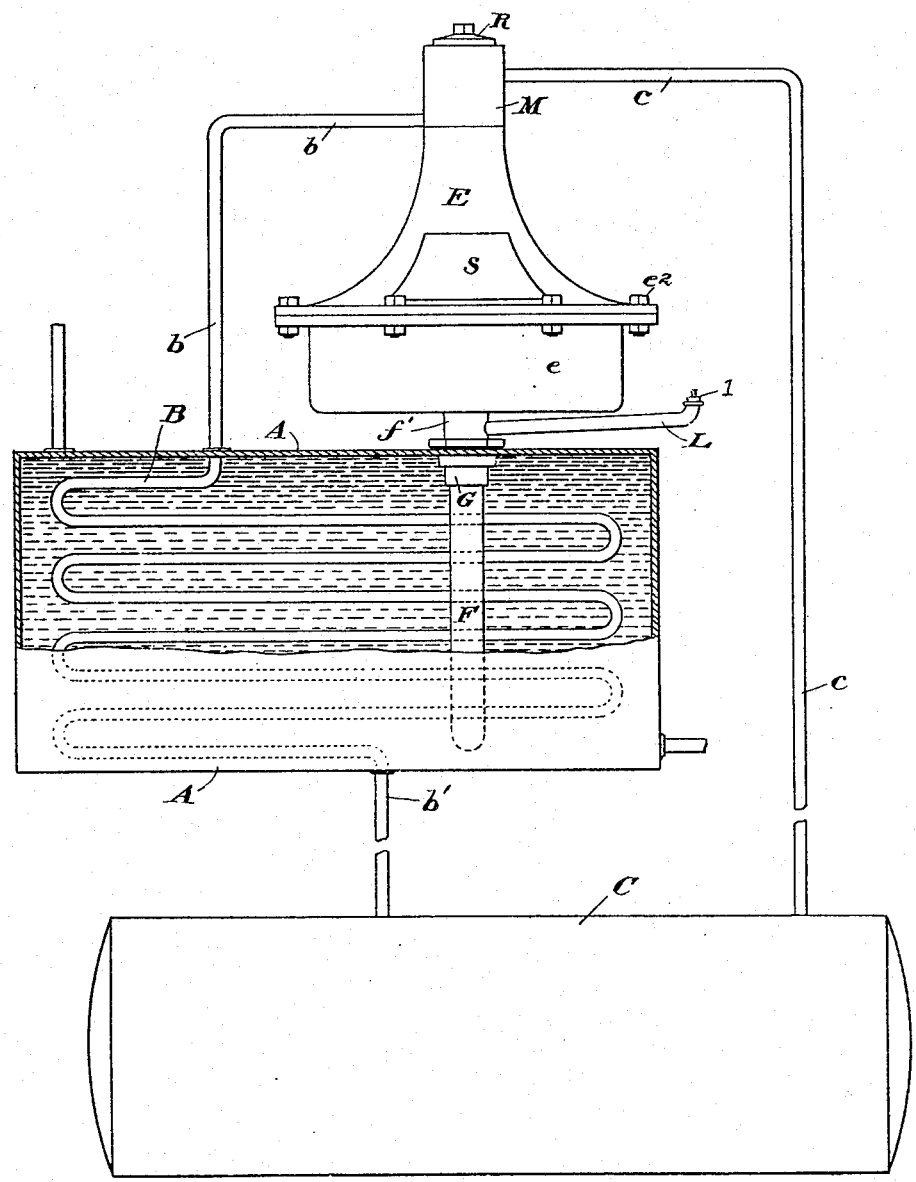

No. 823,157. PATENTED JUNE 12, 1906.
S. J. G. CORNELL.
HOT WATER REGULATOR.
APPLICATION FILED MAR. 29, 1905.

2 SHEETS—SHEET 1.

WITNESSES:
Robert Head
V. E. Nichols

INVENTOR
Samuel J. G. Cornell,
BY Griffin & Bernhard
ATTORNEYS

No. 823,157. PATENTED JUNE 12, 1906.
S. J. G. CORNELL.
HOT WATER REGULATOR.
APPLICATION FILED MAR. 29, 1905.
2 SHEETS—SHEET 2.
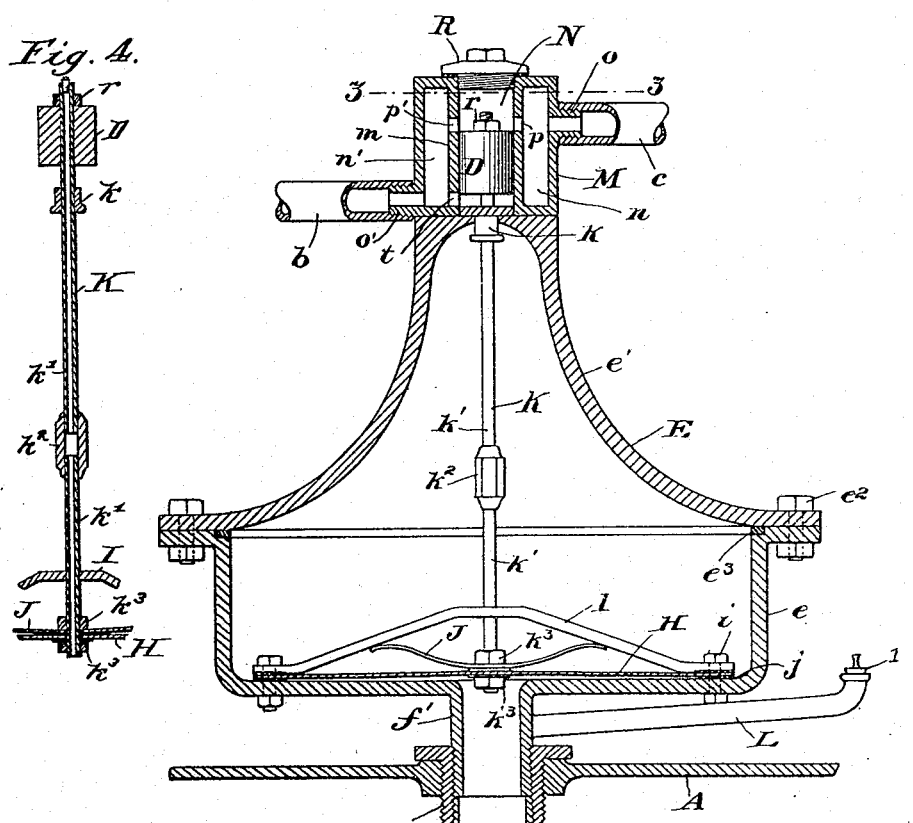
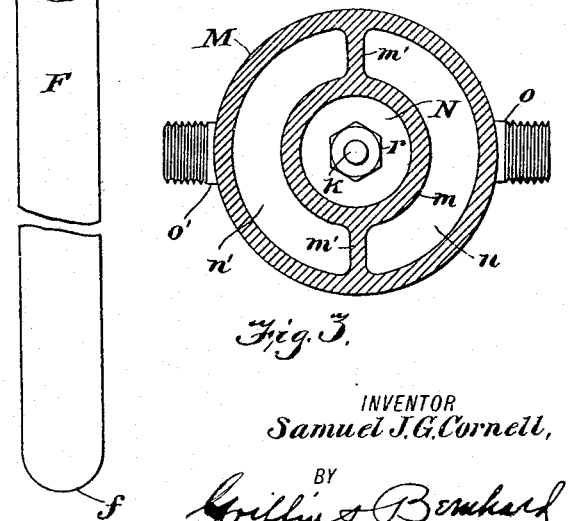
WITNESSES:
Robert Head
V. E. Nichols
INVENTOR
Samuel J. G. Cornell,
BY
Griffin & Bernhard
ATTORNEYS

UNITED STATES PATENT OFFICE.

SAMUEL J. G. CORNELL, OF NEW YORK, N. Y.

HOT-WATER REGULATOR.

No. 823,157.  Specification of Letters Patent.  Patented June 12, 1906.

Application filed March 29, 1905. Serial No. 252,759.

*To all whom it may concern:*

Be it known that I, SAMUEL J. G. CORNELL, a citizen of the United States, residing at New York, borough of Manhattan, in the county of New York and State of New York, have invented certain new and useful Improvements in Hot-Water Regulators, of which the following is a specification.

My invention relates to a fluid-pressure regulator which is especially adapted for use in connection with a hot-water boiler, the latter being designed to supply water at a desired temperature to the faucets of baths, basins, or the like in hotels, apartment-houses, and other places.

In a heating system of this type it is preferred to utilize steam from a boiler as the medium for heating the water in the hot-water boiler.

One object of this invention is to provide a regulator which operates to cut off or reduce the supply of steam when the water in the hot-water boiler is heated to the desired or predetermined temperature, thus securing economy in the use of steam for water-heating purposes.

Another object in view is to enable the regulator to be disconnected from the boiler without disturbing the latter, whereby repairs may be easily and quickly performed on the regulator.

A further object is to provide an improved construction of the regulator wherein the inside parts of the device are easily accessible for adjustment and, further, the parts are simple and durable in construction.

To these ends my invention consists in the combination of a thermostatic tube adapted to be exposed to the heat of a hot-water boiler, a regulator equipped with a diaphragm to be exposed to the action of water contained in said tube, and a supply-valve controllable by the movement of the diaphragm.

Reference is to be had to the accompanying drawings, forming a part of this specification, wherein like characters of reference are used to indicate corresponding parts in all the figures.

Figure 1 is a diagrammatic view illustrating my improved regulator mechanism in connection with a hot-water boiler and a steam-heating system. Fig. 2 is a vertical sectional elevation through the regulator and the supply-valve, a portion of the hot-water boiler shell being shown in connection with a thermostatic tube. Fig. 3 is a sectional plan view on an enlarged scale, the plane of the section being indicated by the dotted line 3 3 of Fig. 2. Fig. 4 is a vertical section through the tubular vertical stem which connects the diaphragm and the valve, said tubular stem being adapted to serve as a filling-tube for the thermostatic tube of my regulator.

In Fig. 1 of the drawings, A designates a hot-water boiler provided with a heating-coil B of any suitable character, said coil being located within the boiler and having a feed-pipe $b$ coupled to one end thereof, the other end of said coil $b'$ extending outside of the boiler A. It is customary to supply live steam to this coil B from any suitable source, such as a main boiler C, from which leads a supply-pipe $c$. Between the pipes $b$ $c$ is a regulating-valve D, that is actuated automatically by a diaphragm-regulator E, which in turn is controlled from a thermostatic tube F.

The tube F is made of metal, such as copper or any other material which is sensitive to the action of heat. I prefer to employ a thin copper tube which is closed at one end, as at $f$, and to provide the other open end of the tube with a male screw-thread. This thermostatic tube is so combined with the boiler A that it will be exposed to the heat of the water therein, and, as shown by Figs. 1 and 2, I prefer to immerse said tube directly in the water of the boiler, although the interior of the tube has no communication with said boiler. In practice I employ a bushing or coupling G as a means for connecting the tube F and the regulator E to the boiler-shell. This bushing has a male thread by which it is screwed into the shell, and it is furthermore provided with an interior or female thread for the reception of the male-threaded end of the tube F. (See Fig. 2.)

The regulator E is arranged externally of the boiler A, and it is connected with the tube F by the bushing G, so as to have communication with said tube. The regulator is adapted to be detached at will from the boiler and the tube F without opening the boiler on the removal of the regulator, thus permitting of repairs to the regulator and of access to the tube. Said regulator is shown as having a casing consisting of the parts $e$ $e'$, which are flanged and bolted together at $e^2$, a packing $e^3$ lying between said sections. The bottom section $e$ of the casing is shown as having a nipple $f'$, adapted to be screwed into the bushing G, said nipple being in communication with the water-space of the tube F. On the bottom of the diaphragm-casing is a diaphragm H, which may be made of any suitable material, although I prefer to employ a thin sheet or disk of copper, which may or may not be corrugated. Said pliable or flexible diaphragm is confined peripherally on the bottom of the casing by a suitable bridge I and a plurality of bolts $i$. A packing or washer $j$ is interposed between the edge of the diaphragm and the bottom of the casing, and a similar packing is employed between the bridge I and the upper face of the diaphragm. The diaphragm is exposed to the pressure in the tube F, and while it has a certain amount of elasticity I find it desirable to employ a spring J for increasing its sensitiveness and insuring a quick return to normal position. Said spring may be of any suitable form and arranged in any desirable way to act on the diaphragm; but as shown the spring is placed between the diaphragm and the bridge.

The upper part $e'$ of the casing is tapered, and at its top a stuffing-box $k$ is provided for the passage of a vertical stem K. Said stem consists of sections $k\ k'$, which are united by a coupling or turnbuckle $k^2$, the lower part of the stem being attached to the diaphragm by suitable nuts $k^3$. It is preferred in some instances to make the stem K of sections of tubing and to unite them by a sleeve $k^2$, as shown by Fig. 4, thus providing means for pouring the liquid through the stem and into the tube F without dismounting the regulator. This end can also be attained by an independent filling-tube L, one end of which is attached to the nipple $f'$ of the casing. The other end of this tube has an elbow adapted to be closed by a suitable cap $l$.

At the top of the diaphragm-casing I provide a steam-chest M, which may be made in one piece with the casing or it may be attached thereto in any appropriate way. This steam-chest is provided with an internal shell $m$, which forms a valve-chamber N, the latter being surrounded by steam-chambers $n\ n'$. The shell $m$ has radial webs $m'$, which divide the steam-chest into steam-chambers $n\ n'$. (See Fig. 3.) The steam-chest has a supply connection $o$ and a feed connection $o'$, to which are attached the pipes $c\ b$, respectively. As shown by Fig. 2, the supply and feed pipes lie on opposite sides of the valve-chamber N, and these pipes communicate with the steam-chambers $n\ n'$. The internal shell $m$ is provided with a steam-inlet $p$, and a steam-outlet $p'$ in its respective walls, and these ports lie in substantially the same horizontal plane and in the plane of the inlet connection $o$. The valve D is arranged in the chamber N so as to have slidable movement therein, and this valve is adapted to be raised and lowered by the stem K in a way to open the ports $p\ p'$ and permit the steam to pass from the pipe $c$ through the ports $p\ p'$ and thence to the feed-pipe $b$, by which the steam is supplied to the heating-coil B. The valve D, however, can be raised by the stem K under the action of the diaphragm H, so as to close the ports $p\ p'$ and cut off the passage of steam through the steam-chest, thus arresting the supply of steam to the coil B. The section $k'$ of the stem passes through the stuffing-box $k$ and through the supply-valve D, the upper end of said section $k'$ being exposed above the valve and provided with a nut $r$. The valve-chamber N is open at its top and is adapted to be closed by a cover R, said cover being removable to enable the operator to pour water through the stem K into the tube F.

The section $e'$ of the diaphragm-casing has a door S of any suitable kind. The door is adapted to be opened for the operator to obtain access to the member $k^2$ of the stem, thus permitting the stem to be lengthened or shortened for the purpose of regulating the travel of the valve D. The valve D is of the balanced type or variety, because it is exposed to steam-pressure both above and below, thus increasing the sensitiveness of operation of the regulator. The chamber $n'$ of the steam-chest is provided with a port $t$, as well as the port $p'$, and this port $t$ establishes communication between the chamber $n'$ and the lower part of the valve-chamber N, whereby steam is supplied both above and below the valve and the latter is made to move easily and freely.

The operation is as follows: Water having been supplied to the tube F, it is heated by the water in the boiler A. Should the temperature of the water in said boiler drop below the desired level, the diaphragm H falls to the position shown by Fig. 2, and the stem K draws the valve D below the ports $p\ p'$, thereby permitting steam to pass from the pipe $c$ through the steam-chest and the pipe $b$ to the coil B. The circulation of steam through the coil raises the temperature of the water in the boiler A, and the heat is communicated to the tube F, thus causing the water in said tube to expand and act against the diaphragm H. The diaphragm and the stem K are lifted and the valve D is raised to close the ports $p\ p'$, thus cutting off the flow of steam from the main boiler C to the coil B in the hot-water boiler.

Changes in the form, size, proportion, and minor details in construction may be made without departing from the spirit of the invention or sacrificing any of the advantages thereof, and I therefore reserve the right to make such alterations and modifications as fairly fall within the scope of my invention.

The invention will be hereinafter more fully described and the novel features defined by the annexed claims:

1. In a device of the class described, a boiler-shell, a thermostatic tube attached to said shell and adapted to be exposed to the heating action of the boiler, a diaphragm-casing communicating with said tube and connected removably to the boiler-shell, whereby the casing may be disconnected without disturbing the thermostatic tube, a diaphragm carried within the casing, a fluid-controlling valve mounted in the casing, and connections between the diaphragm and said valve.

2. In a device of the class described, a diaphragm-casing provided with a diaphragm-chamber and with a steam-chest, a diaphragm in said diaphragm-chamber of the casing, a thermostatic tube communicating with the diaphragm-chamber, fluid inlet and outlet connections for the steam-chest, a valve in said steam-chest, and a direct connection between the diaphragm and the valve.

3. In a device of the class described, a casing provided with a diaphragm-chamber and with a steam-chest, a diaphragm in said chamber, a valve in the steam-chest, and a direct connection between the diaphragm and the valve, said connection being adjustable and extending from the chest to the diaphragm-chamber.

4. In a device of the class described, a casing provided with a diaphragm-chamber and a fluid-chest, a diaphragm in the chamber, a valve in the fluid-chest, a thermostatic tube, and a direct hollow connection between the diaphragm and the valve, said connection affording means for refilling the thermostatic tube without removing said parts.

5. In a device of the class described, a diaphragm-casing, a thermostatic tube communicating with said casing, a fluid-chest having a removable closure, a diaphragm in said casing, a valve in the chest, and a tube extending through the valve and the diaphragm and affording means for refilling the tube, said tube operating to transmit the motion of the diaphragm directly to the valve.

6. In a device of the class described, a diaphragm-casing, a thermostatic tube communicating with said casing, a fluid-chest, a diaphragm held in said casing, a valve movable in the fluid-chest, and a tube directly connected to said valve and the diaphragm for communicating the motion of the diaphragm to the valve, said tube being constructed in sections which are united by a coupling located intermediate of the diaphragm and the valve.

7. In a device of the class described, a diaphragm-casing, a diaphragm located in a chamber thereof, a steam-chest at one end of the diaphragm-casing, a valve movable in said steam-chest, a bridge located in the diaphragm-casing and clamping the diaphragm to said casing, a spring seated on the bridge and acting on the diaphragm, and a direct connection between the diaphragm and the valve, said connection being fitted slidably to the bridge.

8. In a device of the class described, a diaphragm-casing, a thermostatic tube communicating with a chamber of said casing, a diaphragm held in said casing, a steam-chest at one end of the diaphragm-casing, inlet and outlet connections for said steam-chest, a valve slidable in the steam-chest, and a tubular connection extending through the diaphragm-casing, said connection being attached to the diaphragm and the valve, and affording means for refilling the thermostatic tube without disconnecting the aforesaid parts.

In testimony whereof I have signed my name to this specification in the presence of two subscribing witnesses.

SAMUEL J. G. CORNELL.

Witnesses:
H. I. BERNHARD,
JAS. H. GRIFFIN.